United States Patent [19]

Hain et al.

[11] 4,306,493

[45] Dec. 22, 1981

[54] DEVICE FOR WASHING AND COOLING THE GRANULATE OF COTTAGE CHEESE, CURD OR THE LIKE

[75] Inventors: Gottfried Hain, Lehen; Bernard Wulff, Stephanskirchen-Westerndorf; Johann Stacheter, Hogling, all of Fed. Rep. of Germany

[73] Assignee: Alpma Alpenland Maschinenbau Hain & Co. KG, Fed. Rep. of Germany

[21] Appl. No.: 82,257

[22] Filed: Oct. 5, 1979

[30] Foreign Application Priority Data

Oct. 5, 1978 [DE] Fed. Rep. of Germany ....... 2843800

[51] Int. Cl.³ .............................................. A01J 25/11
[52] U.S. Cl. ....................................... 99/459; 99/464; 99/465; 99/517
[58] Field of Search ......................... 99/452, 456–462, 99/464–466, 516, 517

[56] References Cited

U.S. PATENT DOCUMENTS

| | | | |
|---|---|---|---|
| 2,351,458 | 6/1944 | Senn | 99/456 |
| 2,649,377 | 8/1953 | Wilmsmann | 99/458 |
| 2,791,834 | 5/1957 | Nanz | 99/456 |
| 3,044,863 | 7/1962 | Osborne et al. | 99/517 |
| 4,156,384 | 5/1979 | Hinds, Jr. et al. | 99/459 |

Primary Examiner—Philip R. Coe
Assistant Examiner—Timothy F. Simone
Attorney, Agent, or Firm—William A. Drucker

[57] ABSTRACT

In a process and device for the washing and cooling of cottage cheese, curd and the like, after scalding, granulate with the whey removed is introduced into a vessel, cooled and washed by means of a flowing washing and cooling liquid, and is then removed from the vessel for further processing. The improvement is provided that the granulate is continuously introduced into the washing vessel filled with washing and cooling liquid at a predetermined rate. The granulate is then moved on in this liquid to a removal position, and is finally continuously removed from the vessel at the same rate.

7 Claims, 1 Drawing Figure

U.S. Patent  Dec. 22, 1981  4,306,493
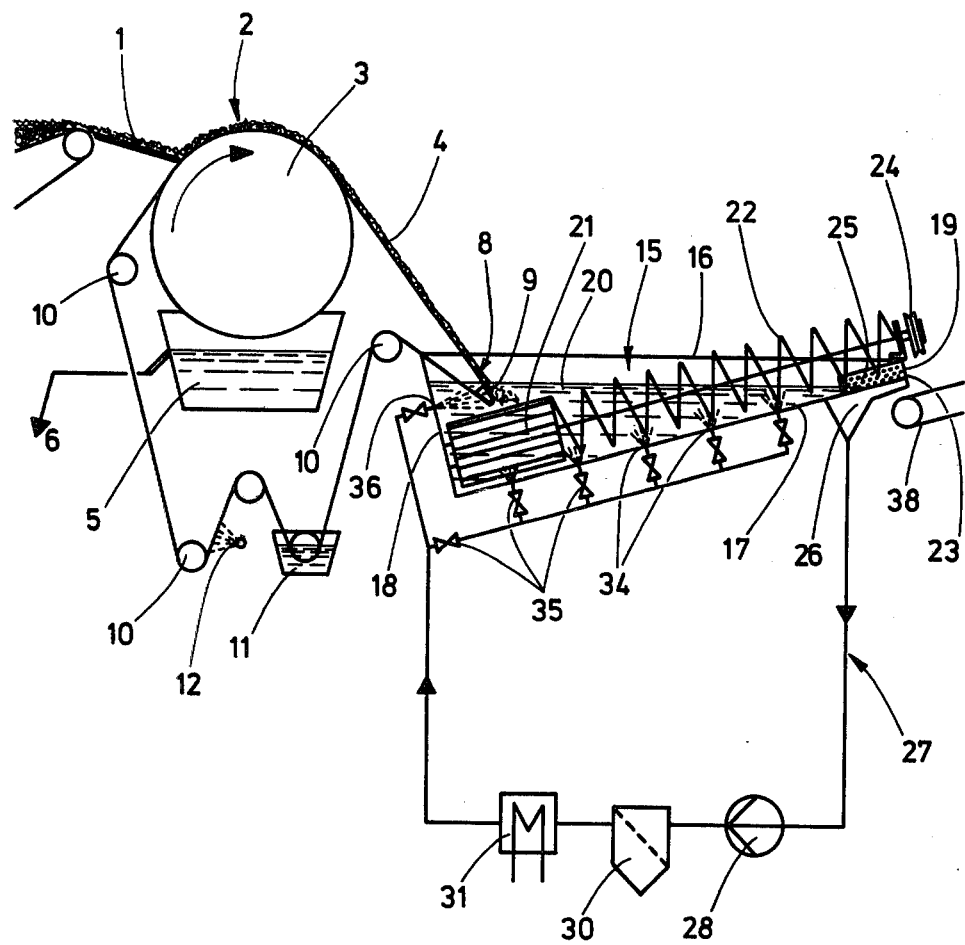

DEVICE FOR WASHING AND COOLING THE GRANULATE OF COTTAGE CHEESE, CURD OR THE LIKE

BACKGROUND OF THE INVENTION

The invention relates to a device for washing and cooling the granulate of cottage cheese, curd or the like, in which the granulate, with the whey removed after scalding and having been introduced into a vessel, is washed and cooled by means of a flowing washing and cooling liquid and then removed from the vessel and moved on for further processing.

THE PRIOR ART

Cottage cheese, curd or the like have hitherto been produced in a vessel, or in several vessels used in sequence, by the method in which the curdled milk is first of all cut up into suitable granules, this granulate is then scalded with heated whey and finally, after extensive removal of the whey, is subjected to washing and cooling. To achieve this, the granulate is mostly introduced into a washing vessel which is then supplied with a washing and cooling liquid, to wash and cool the granulate by generating an agitating motion. On completion of this treatment, the granulate is lifted out of the vessel, either manually or with ladles, or is pumped together with the washing water into a separating or settling vessel. In a known washing device (U.S. Pat. No. 3,044,863) the washing liquid is made to circulate in counter-flow, to intensify and accelerate the washing and cooling of the granulate. Despite this counter-flow, however, the granulate sinks to the bottom of the processing chamber, where it compacts, so that the disintegrated structure aimed at is lost.

In another known device (German Pat. No. 2,141,465) a loose consistency of the granulate is aimed at by flowing through the mass of granulate in the chamber from the bottom upwards. But here too compaction of the granulate at the end of the washing and cooling process cannot be prevented because, before the granulate is removed, the washing liquid must be removed, and the granulate then builds up in deep layers. The known washing devices only permit operation in batches, which is very time-consuming, and the water and power consumptions are also relatively large. Finally there is also the fact that the operating conditions for the batches during an individual processing period mostly vary quite considerably, and consequently a product of uniform quality and consistency cannot be achieved.

OBJECT OF THE INVENTION

Consequently the problem on which the invention is based is to propose a device for washing and and cooling the granulate of cottage cheese, curd or the like, to achieve in this way continuous treatment of the granulate whilst maintaining uniform operating conditions.

SUMMARY OF THE INVENTION

This problem is solved according to the present invention by a device of the type referred to first herein wherein the granulate is continuously introduced at a predetermined rate into the washing vessel filled with a washing and cooling liquid, is then moved on in this liquid as far as a delivery position and finally removed from the vessel at the same rate.

By introducing the granulate, especially if in accordance with an advantageous solution this takes place just below the surface of the liquid, the latter is separated and floated apart. In this simple way, a disintegration of the granulate mass is achieved which can be maintained also in the liquid, because the granulate, kept permanently in motion, has no chance to settle. On the contrary, because of the continued feeding motion acting on the granulate, the latter is held in a floating state. Since supplying and emptying the washing vessel are carried out continuously, there are never such quantities of granulate in the washing vessel at one time that congestion and accumulation could occur.

The floating motion of the individual granules will be intensified the more when an additional agitating motion is generated in the vessel and the washing and cooling of the granulate is thereby still further accelerated.

A preferred device comprises a washing vessel under the continuously supplied feeder conveyor of a whey-removing device for the granulate, in which there is located immediately above the bottom of the washing vessel a feeding device for the granulate introduced, and at the end of this feeding device an arrangement for removing the granulate is provided.

With a simple device such as this the granulate can be washed and cooled during continuous passage. A particularly advantageous washing device has a rising bottom with feeding and removal devices which also rise. In this way, the granulate introduced into the vessel is not only moved forwards, but at the same time also upwards, and thus gradually removed from the washing liquid and from the vessel. This washing device can be made particularly simple if a screw conveyor which matches the bottom cross-section of a longitudinal trough is used as a feeding and removal device.

In an advantageous development, a screening bottom is formed before the removal rim, which removes the washing liquid so that finally only granulate which is largely freed from liquid is removed for further processing.

BRIEF DESCRIPTION OF THE DRAWING

The single FIGURE of the drawing is a schematic side elevation of a preferred embodiment of device in accordance with the invention.

DESCRIPTION OF THE PREFERRED EMBODIMENT

In the device shown, a sliding surface 1 of a device for producing the granulate (not shown) is connected to a whey-removing device 2 with a screening cylinder 3, over which a plastic lattice belt 4 is led, to make possible the removal of whey from the granulate in this way. The whey flowing away is collected in a collecting vessel 5 and finally removed at 6. The plastic lattice belt runs from the screening cylinder as supply conveyor 8 as far as an angular return lip 9. As a result of the reversal produced by this means, the granulate adhering to the lattice belt is also reliably detached, especially if the delivery position is located below the surface of the liquid 20. From this delivery position the lattice belt runs back on to the screening cylinder over several return pulleys, in the course of which it can pass inter alia also a stripper (not shown), a cleaning or disinfecting bath 11 and a spraying device 12. The removal of whey is above all reinforced and accelerated by the fact that the screening cylinder is raised relative to the sliding surface, and by this means a lengthening of the whey-removal section is gained. The convex surface produces a further loosening of the granulate layer accommodated. Under the feeding conveyor 8 there is a washing vessel 15, e.g. arranged in the form of an oblong trough 16, whose bottom surface 16 rises steadily from the feeding end 18 to the removal end 19. The removal end 19 is consequently raised above the surface of the liquid 20. At the feeding end there is fitted an agitating mechanism 21, to which there is connected a screw conveyor 22 which extends to a removal rim 23 at the removal end 19. Between the worm threads of the screw conveyor and the tub-shaped vessel bottom 17 there is a clearance sufficient to ensure that the granulate is not squashed or destroyed. A gap of 1 mm has for instance proved expedient. The screw conveyor, which runs substantially parallel to the vessel bottom, is fitted at its upper end with a drive wheel 24 with which the screw conveyor and the agitating mechanism, provided that it is connected with the worm, is made to rotate. In doing so, such a speed is selected that the introduced granulate can also be removed with certainty without blockage and accumulation. At the removal end 19, before the removal rim 23, the vessel bottom is formed as a screen wall 25, through which the liquid which exceeds the liquid level, and which carried up with the granulate by the worm, runs off into a collecting channel 26. This channel is connected to a circulating pipe 27, through which the washing liquid is also sucked out of the vessel and made to circulate.

There is used for this a pump 28, which pumps the washing liquid back into the vessel. In addition to the circulating pump 28, a cleaning device 30 and a cooling device 31 can also be installed in this circulating pipe. On the other hand, of course, there is also the option of continuously feeding fresh iced water into the vessel and/or of mixing this fresh water with the circulating water. The addition of liquid, either from the circulating pipe, and/or from the fresh water supply, to the washing vessel expediently takes place through a series of admission nozzles 34 which are distributed along the vessel bottom and are adjustable by means of valves 35.

By this means it is ensured that the floating state of the granulate is maintained also along the sloping floor, and deposits between the worm threads are prevented. An admission nozzle 36 can also be directed onto the reversing position of lattice belt, to wash off granulate and residue from the lattice belt.

At the outlet end 19 of the vessel, the granulate is collected by a removal conveyor 38 and supplied to the further processing stations.

The device according to the invention operates as follows:

The granulate, with the whey removed through the screening cylinder 3, is introduced into the washing vessel 15 by the feeding conveyor 8, separated out by means of the liquid which is kept moving, and brought to a state of suspension. The floating movement of the granulate is still further intensified by means of the agitating mechanism 21 and the washing jets leaving the admission nozzles 34. The maintained through-flow also conveys the granulate from the inlet end to the outlet end, where it is de-watered and removed. The screw conveyor 22 will rotate at such a speed that the same quantity of granulate is removed from the vessel as is introduced into the liquid at the inlet end. The granulate is powerfully moved in the liquid by means of the screw conveyor and the washing jets, and thereby thoroughly washed and quickly cooled. Because the powerful liquid movement keeps the granulate in a floating state, there is no damage to the granulate. Similarly, blockages and accumulations of granulate are prevented. In the area of the screening wall, the granulate mass is pushed forward by the screw conveyor as far as the removal rim. Since the granulate is already washed and cooled it shows a firmer more consistent surface which is no longer sensitive. The granules roll off each other, as a result of which they come to no harm here either.

The invention is not restricted to the embodiment shown. Instead of the screw conveyor, another conveying device can be used to convey the granulate, such as an inclined hoist with scraper strips, a scraper or the like. In this case, no tub-shaped bottom is necessary. The process according to the invention can also be carried out if the sloping vessel bottom either starts at a distance from the inlet end or is omitted altogether.

Conveyance of the granulate over the flat or horizontal bottom can then be performed by an appropriate conveying device, as mentioned previously, and the steep lift by a separate removal device, such as e.g. a bucket or scoop mechanism.

We claim:

1. A device, for the treatment of granulate of cottage cheese, curd and the like, comprising:
    (i) an elongated trough-shaped washing vessel having an inlet end and an outlet end and including a semicircular bottom surface which is inclined upwardly from the inlet end to the outlet end, said vessel containing a washing and cooling liquid,
    (ii) means for freeing the whey from the curd,
    (iii) means for feeding said curd granulate into the inlet end of the washing vessel;
    (iv) a rotary screw conveyor situated at least partially in the washing vessel and partially in the liquid and disposed along and adjacent to the inclined bottom surface, the rotary screw conveyor acting in the direction to sweep curd granulate along the vessel bottom from the inlet end to the outlet end,
    (v) means including a pump providing a flow path for said washing and cooling liquid from the outlet end of the vessel to the inlet end thereof,
    (vi) and a plurality of liquid inlet nozzles disposed along said vessel bottom below said liquid and opening into the vessel, said nozzle communicating with said flow path means downstream of said pump, whereby washing and cooling liquid from said flow path means may be injected into the vessel to maintain curd granulates in a floating state in the liquid in the vessel.

2. A device, as claimed in claim 1, wherein the vessel is provided at its outlet end with a screen disposed generally above the level of liquid in the vessel and adjacent to said conveying means, said screen communicating with said flow path means for return thereto of any liquid which may get carried by the conveyor, with the curd granulate, above the normal liquid level.

3. A device, as claimed in claim 1, wherein said means for feeding curd granulate to the inlet end of the vessel is a belt conveyor which travels downwardly into the inlet end of the vessel and passes about a return lip below the level of liquid in the vessel.

4. A device, as claimed in claim 1, including agitator means disposed in said vessel adjacent to the inlet end thereof.

5. A device, as claimed in claim 1, wherein said flow path means includes means for cleaning the liquid flowing therein.

6. A device, as claimed in claim 1, wherein said flow path means includes means for cooling the liquid flowing therein.

7. A device, for the treatment of granulate of cottage cheese, curd and the like, comprising:
- (i) an elongated trough-shaped washing vessel having an inlet end and an outlet end and including a bottom surface which is inclined upwardly from the inlet end to the outlet end, said vessel containing a washing and cooling liquid,
- (ii) a whey-removing device, including a screening cylinder, for feeding curd granulate freed of whey into the inlet end of the washing vessel;
- (iii) a conveying means situated at least partially in the washing vessel and disposed along and adjacent to the inclined bottom surface, the conveying means acting in the direction to sweep curd granulate along the vessel bottom from the inlet end to the outlet end,
- (iv) means including a pump providing a flow path for said washing and cooling liquid from the outlet end of the vessel to the inlet end thereof,
- (v) and a plurality of liquid inlet nozzles disposed along said vessel bottom below said liquid and opening into the vessel, said nozzles communicating with said flow path means downstream of said pump, whereby washing and cooling liquid from said flow path means may be injected into the vessel to maintain curd granulates in a floating state in the liquid in the vessel.

* * * * *